United States Patent
Clingman et al.

(10) Patent No.: US 8,347,747 B2
(45) Date of Patent: Jan. 8, 2013

(54) STRAIN ENERGY SHUTTLE APPARATUS AND METHOD

(75) Inventors: Dan J. Clingman, Auburn, WA (US); Robert T. Ruggeri, Kirkland, WA (US); W. Dean Clingman, Renton, WA (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 12/349,583

(22) Filed: Jan. 7, 2009

(65) Prior Publication Data

US 2010/0065679 A1 Mar. 18, 2010

Related U.S. Application Data

(62) Division of application No. 10/909,784, filed on Jul. 30, 2004, now Pat. No. 7,516,680.

(60) Provisional application No. 60/491,075, filed on Jul. 30, 2003.

(51) Int. Cl.
*F16H 21/22* (2006.01)
*E05F 1/08* (2006.01)

(52) U.S. Cl. .................. 74/44; 16/281; 16/286; 16/298; 74/51; 244/99.2; 267/150

(58) Field of Classification Search ................ 16/64, 65, 16/79, 80, 280, 281, 286, 293, 296, 298–301; 74/44, 45, 49, 51; 267/150, 250; 92/130 D; 29/267; 244/99.2, 99.3; 416/131, 135, 136, 416/147, 162
See application file for complete search history.

(56) References Cited

U.S. PATENT DOCUMENTS

| | | | | | |
|---|---|---|---|---|---|
| 987,467 | A | * | 3/1911 | Katzenberger | 16/281 |
| 1,123,478 | A | * | 1/1915 | Brucker | 16/281 |
| 1,519,584 | A | * | 12/1924 | Kreipke | 16/69 |
| 2,035,823 | A | * | 3/1936 | Moore | 16/284 |
| 3,265,332 | A | * | 8/1966 | Rasmussen | 244/76 R |
| 5,440,969 | A | * | 8/1995 | Shin | 92/68 |
| 5,904,411 | A | * | 5/1999 | Hayakawa | 16/289 |
| 6,065,934 | A | | 5/2000 | Jacot et al. | |
| 6,155,531 | A | * | 12/2000 | Holborow et al. | 251/30.02 |
| 6,499,952 | B1 | | 12/2002 | Jacot et al. | |
| 6,966,150 | B2 | * | 11/2005 | Chiang | 16/252 |
| 7,305,796 | B2 | * | 12/2007 | Chiang | 16/252 |

* cited by examiner

*Primary Examiner* — William C Joyce
(74) *Attorney, Agent, or Firm* — Harness, Dickey & Pierce, P.L.C.

(57) ABSTRACT

A method for providing torque to assist in moving a component of a mobile platform. Biasing forces may be applied to opposing portions of a torque transferring member that enable the torque transferring member to be maintained in a position of equilibrium. A torque may be applied to one of the component and the torque transferring member such that the biasing forces cooperatively exert a torque on the torque transferring member to assist in moving the torque transferring member out from the position of equilibrium. Motion of the torque transferring member out from the position of equilibrium may be used to assist in moving the component.

16 Claims, 8 Drawing Sheets

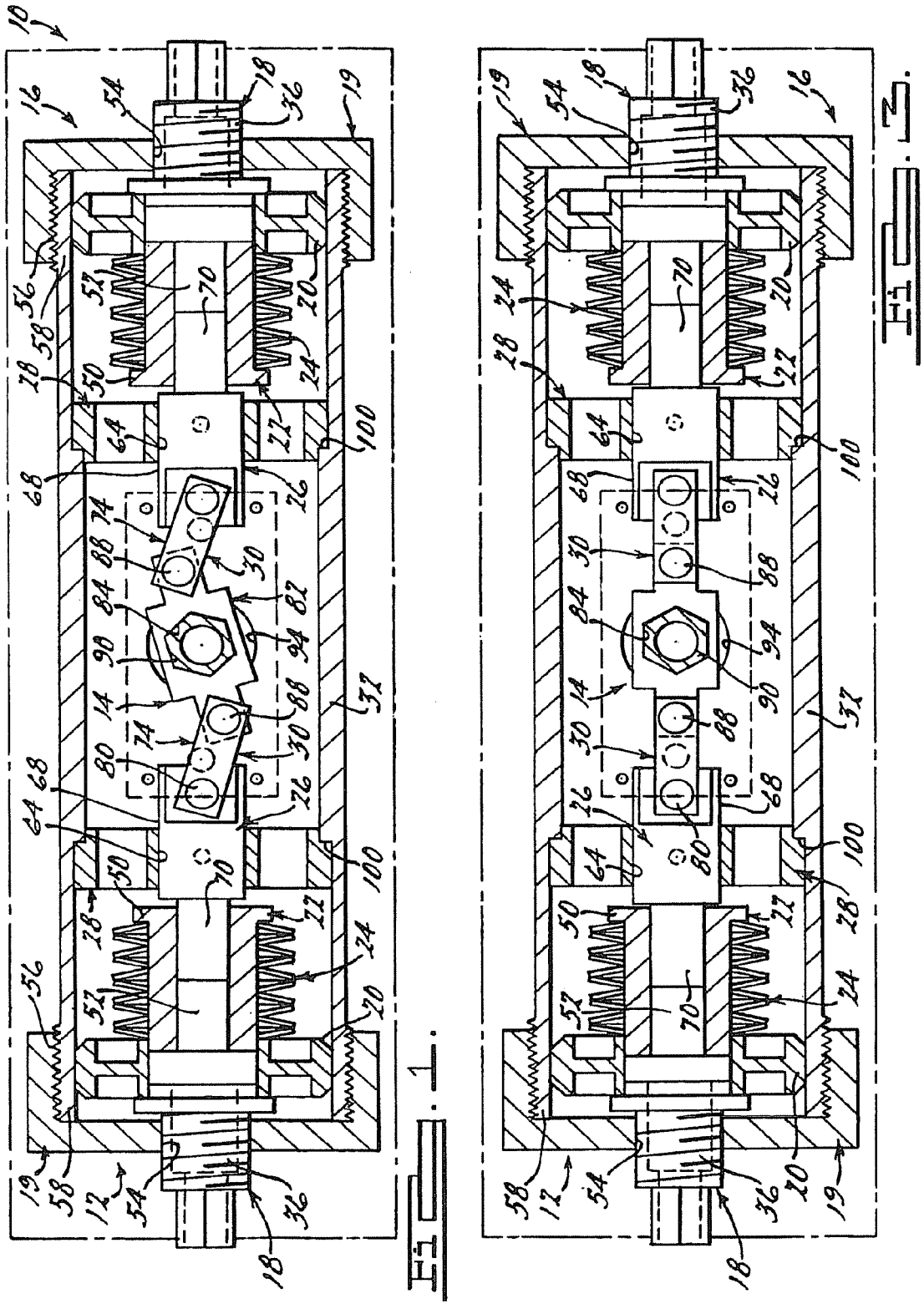

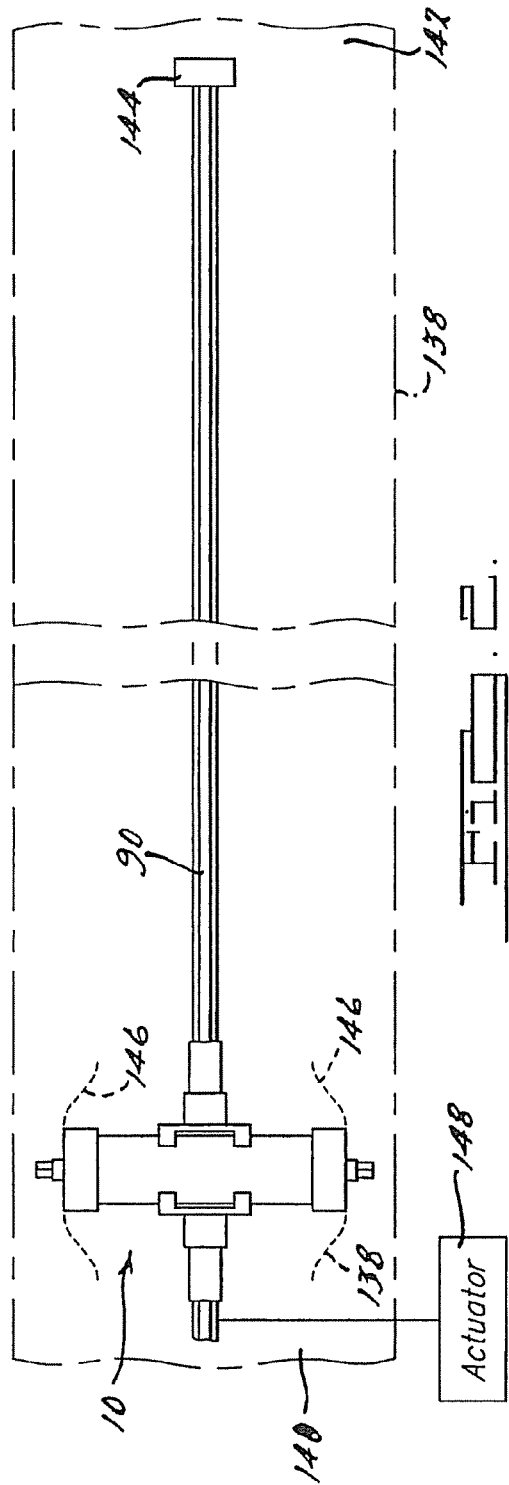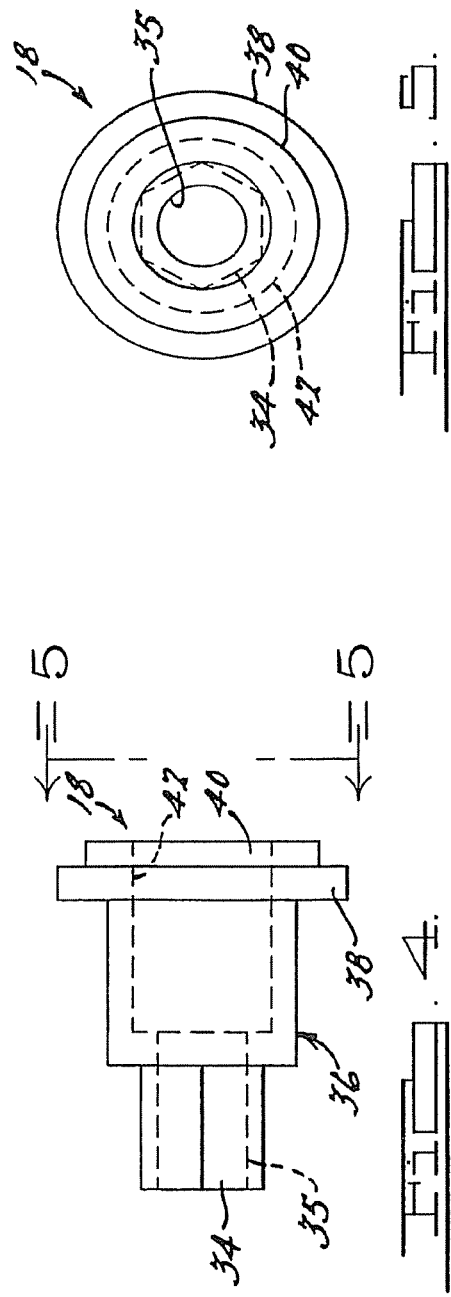

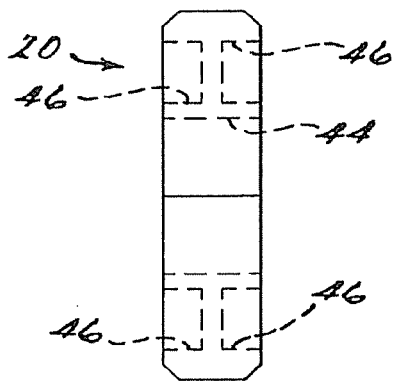
FIG. 6.
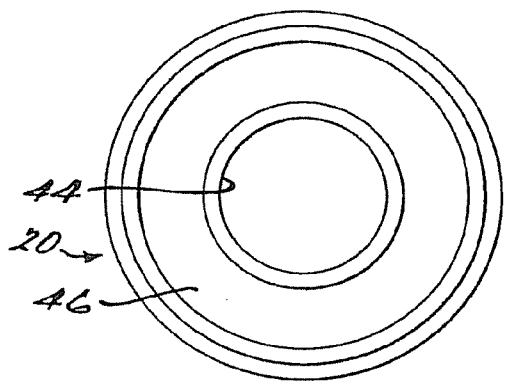
FIG. 7.
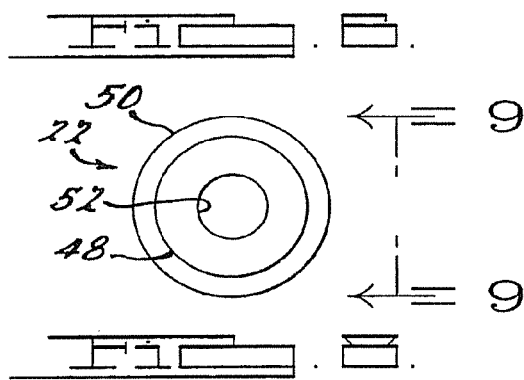
FIG. 8.
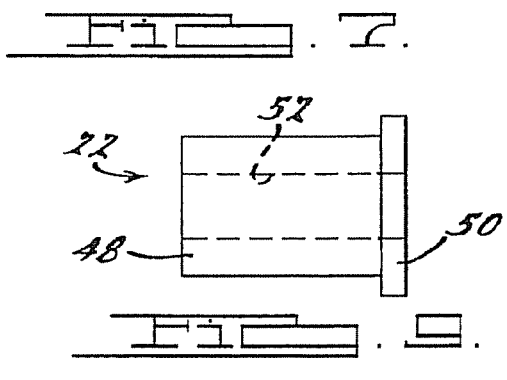
FIG. 9.
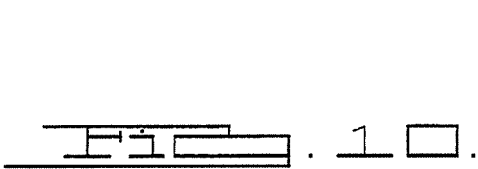
FIG. 10.
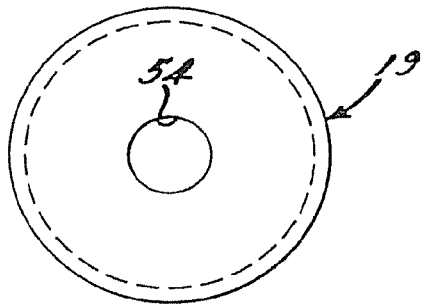
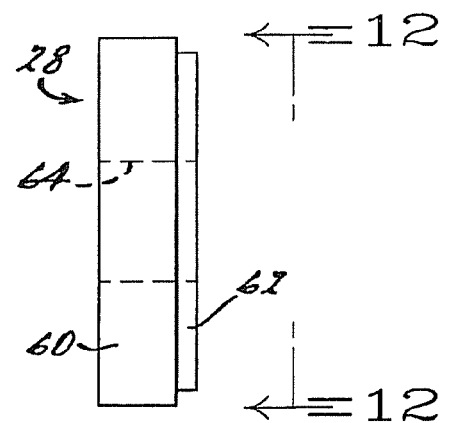
FIG. 11.
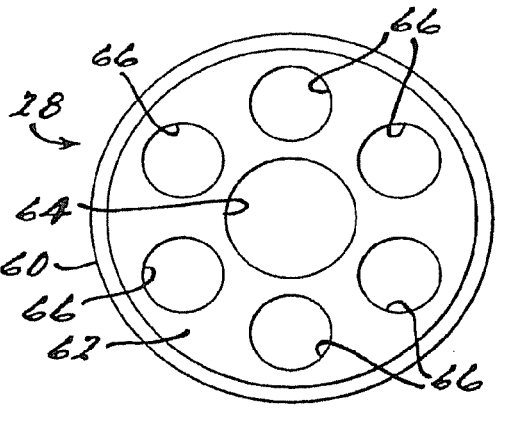
FIG. 12.

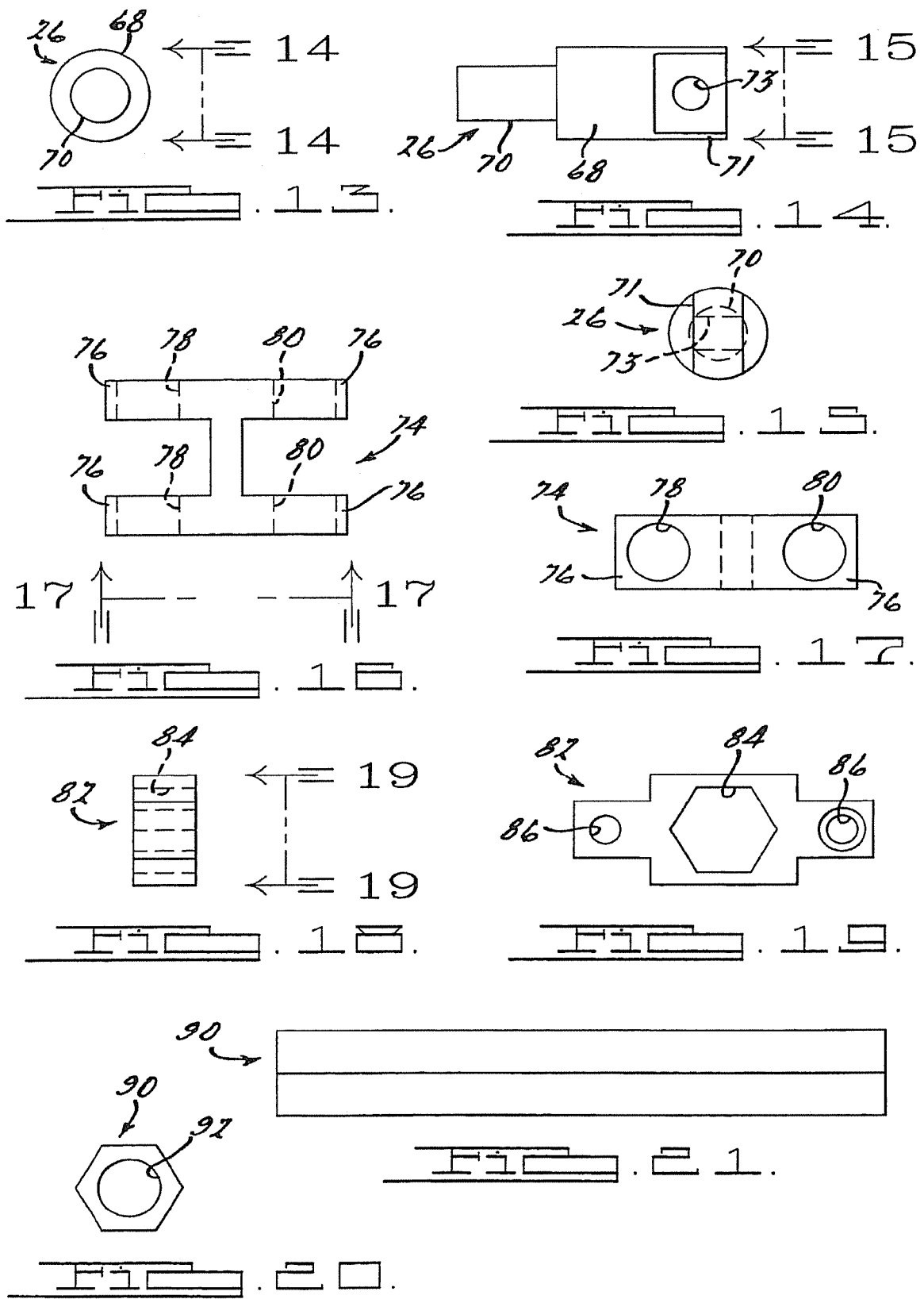

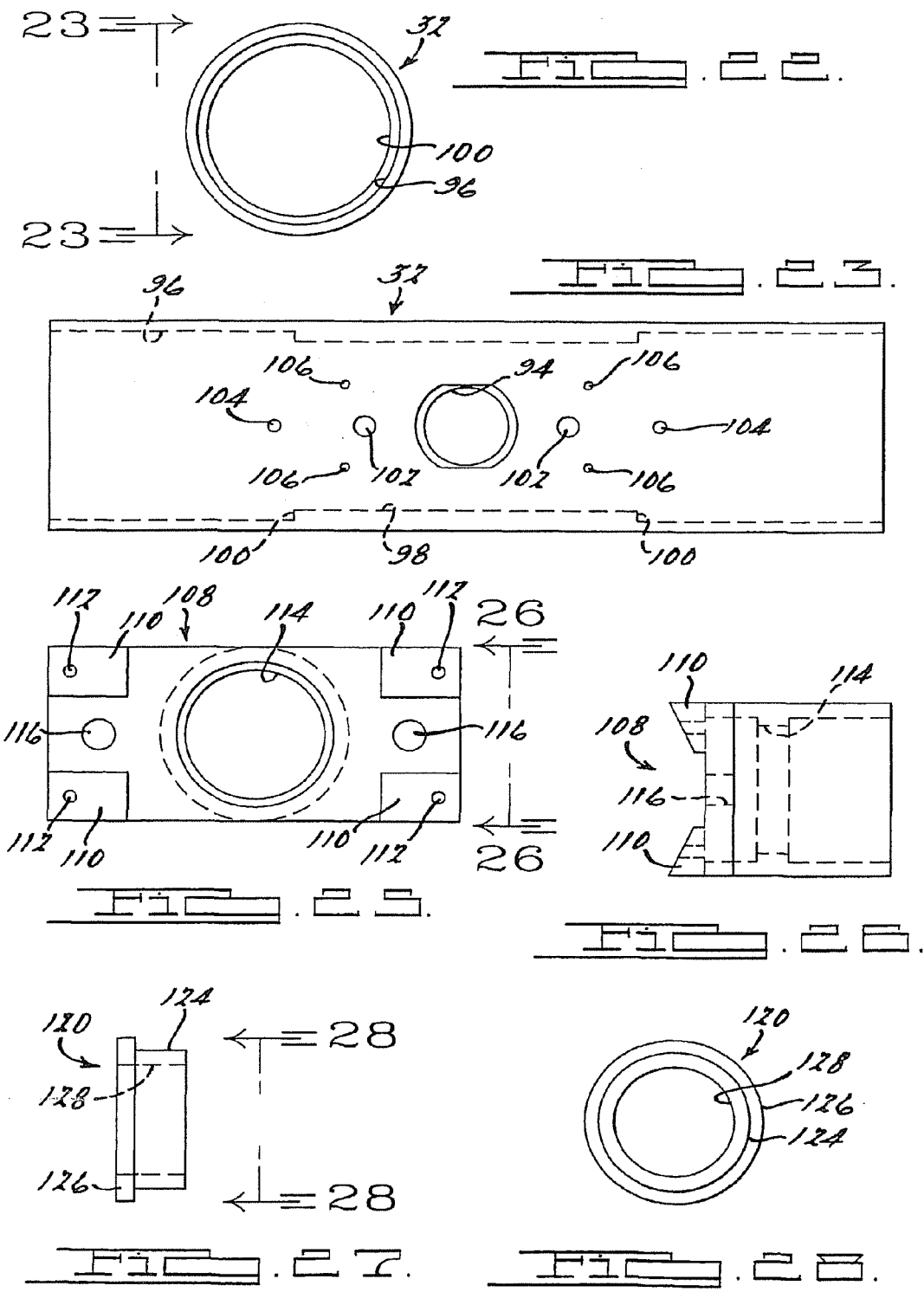

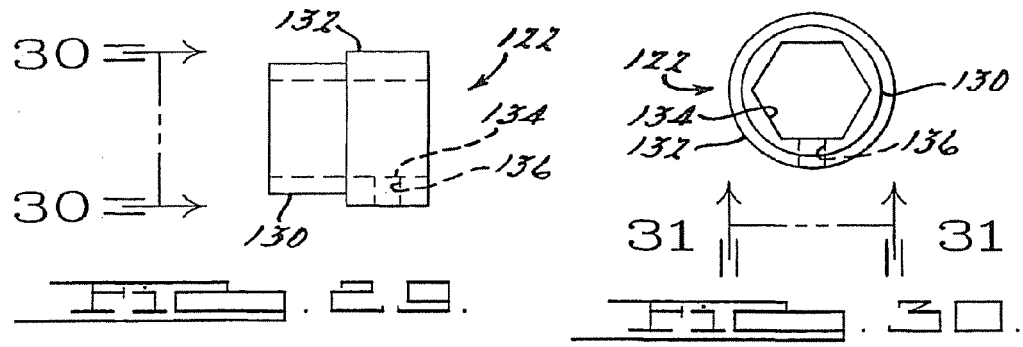
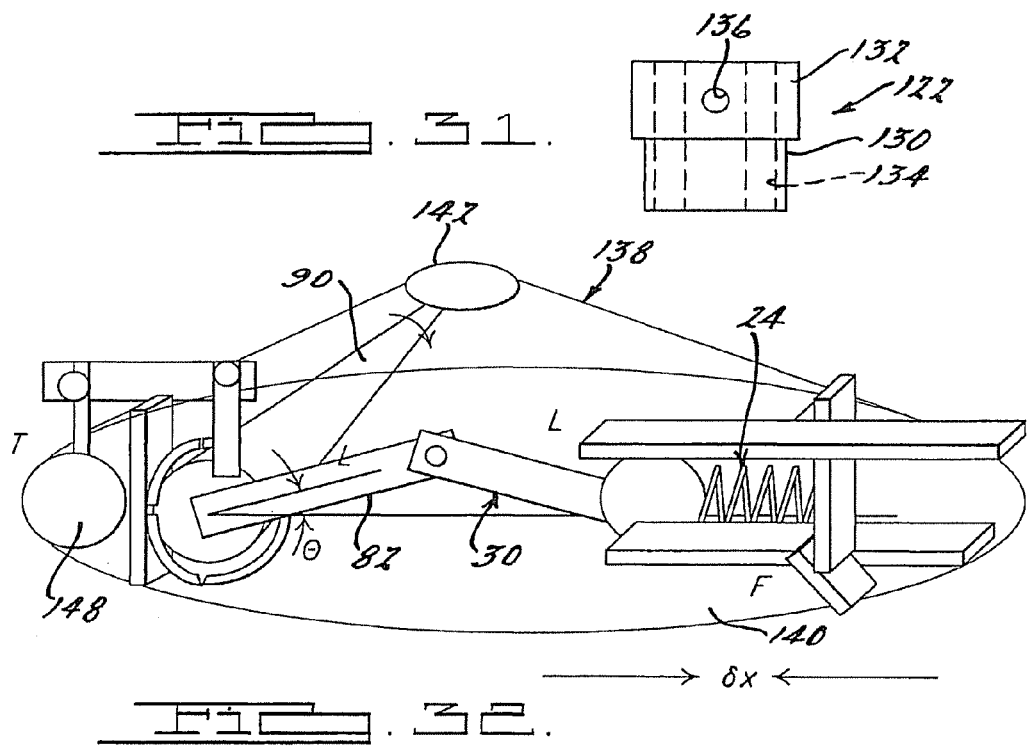
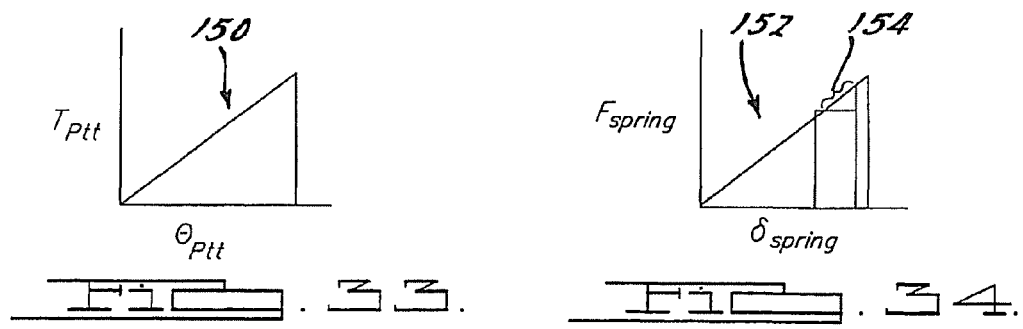

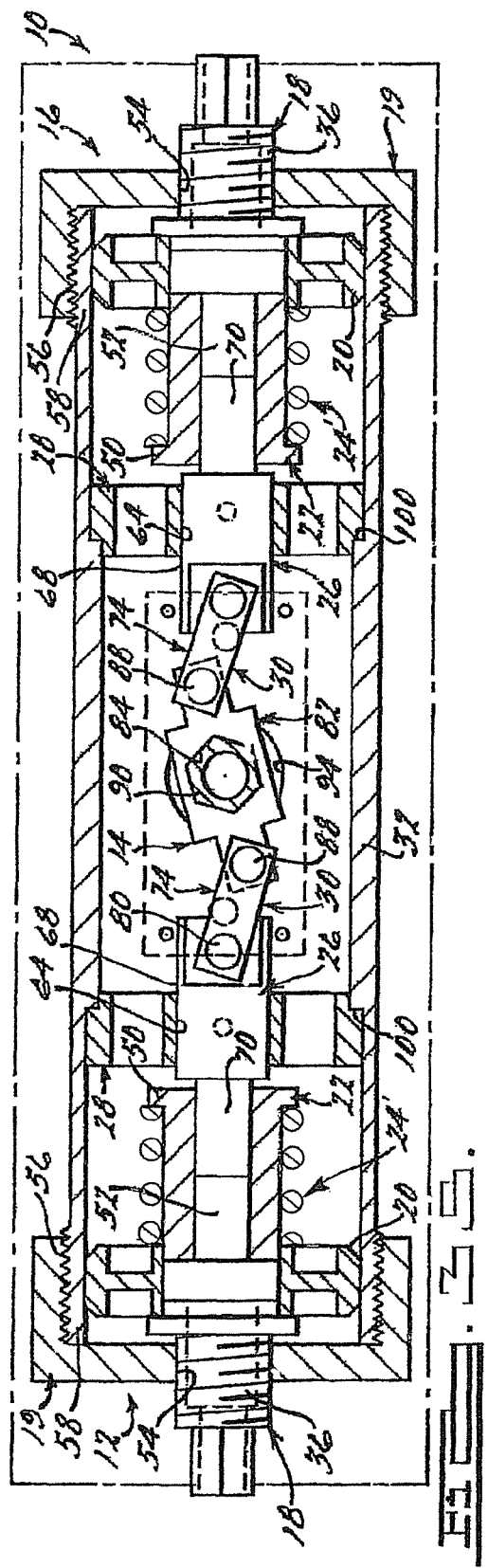

STRAIN ENERGY SHUTTLE APPARATUS AND METHOD

CROSS-REFERENCE TO RELATED APPLICATIONS

This application is a divisional of U.S. patent application Ser. No. 10/909,784, filed Jul. 30, 2004, which claims priority to U.S. Provisional Application No. 60/491,075, filed on Jul. 30, 2003. The disclosure of the above application is incorporated herein by reference.

FIELD

The present disclosure relates to systems for providing a torque to move an object that needs to be rotated, and more particularly to an energy shuttle apparatus and method that converts linear motion into a rotary motion for providing a torque to a component that is required to be rotated or twisted.

BACKGROUND

The ability to controllably twist or bend a wing, airfoil or rotorcraft blade, during various phases of flight of an aircraft or rotorcraft, has been a goal of design engineers for some time. The ability to controllably twist or deform a wing, air foil, rotorcraft blade, etc. during various phases of flight can significantly enhance the performance of an aircraft or rotorcraft.

A major obstacle to implementing actuators or other devices that are designed to twist a wing of an aircraft, a blade of a rotorcraft, etc. is that the actuator or other device used for this purpose must overcome the inherent structural stiffness of the material used to form the wing or rotorcraft blade. This limitation has required that such actuators or other like devices be physically large in relation to the wing or rotorcraft blade which they are associated with, as well as expensive, and further require a significant degree of power to overcome the structural stiffness of the structure which needs to be twisted or flexed.

Accordingly, there still exists a need in the art for a relatively lightweight, compact apparatus capable of being integrated for use with an air foil, wing, rotorcraft blade, etc. that can twist or deform the air foil, wing or rotorcraft blade as needed, and which further does not require the use of large actuators.

SUMMARY

In one aspect the present disclosure relates to a method for providing torque to assist in moving a component of a mobile platform. The method may comprise applying biasing forces to opposing portions of a torque transferring member to exert forces on the torque transferring member that enable the torque transferring member to be maintained in a position of equilibrium. A torque may be applied to one of the component and the torque transferring member such that the biasing forces cooperatively exert a torque on the torque transferring member to assist in moving the torque transferring member out from the position of equilibrium. Motion of the torque transferring member out from the position of equilibrium may be used to assist in moving the component.

In another aspect the present disclosure relates to a method for providing a torque to a component of an airborne mobile platform to assist in moving the component. The method may comprise coupling a torque transferring member to the component. A biasing member may be disposed under one of compression and tension relative to the torque transferring member to exert a force that acts on the torque transferring member when the torque transferring member is moved from a first position of equilibrium, wherein the component experiences no rotation causing force from the torque transferring member, to a second position wherein the torque transferring member exerts a torque on the component. An actuator may be used to initiate movement of one of the torque transferring member and the component to urge the component into the second position, wherein the force from the biasing member assists in urging the torque transferring member to move rotationally, to cause movement of the component to the second position.

In another aspect the present disclosure relates to a method for moving a flight control structure on an airborne mobile platform between first and second positions in a manner that overcomes an inherent structural stiffness of the structure. The method may involve coupling at least one end of a force transferring member fixedly to the structure. A biasing element may be loaded, while the structure is being held in the second position, with a force sufficient to substantially hold the structure in the second position. Energy stored in the biasing element may be used to move the torque transferring member so as to assist in moving the structure from the first position to the second position when movement of the structure is initiated by an external component, to thus substantially transfer the stored energy of the biasing element to the structure through the torque transferring member. The biasing element may be used to again store the energy when the structure is moved from the second position back to the first position.

BRIEF DESCRIPTION OF THE DRAWINGS

The present disclosure will become more fully understood from the detailed description and the accompanying drawings, wherein:

FIG. 1 is a side view of an apparatus in accordance with a preferred embodiment of the present disclosure;

FIG. 2 is a simplified plan view of a portion of a wing showing the apparatus incorporated in the wing;

FIG. 3 is a view of the apparatus imparting a torque to a torque tube to twist the wing of FIG. 2;

FIG. 4 is a side view of the tension adjuster;

FIG. 5 is an end view of the tension adjuster taken in accordance with directional line 5-5 in FIG. 4;

FIG. 6 is a side view of the end guide;

FIG. 7 is a front view of the end guide;

FIG. 8 is an end view of the spring guide;

FIG. 9 is a side view of the spring guide taken in accordance with directional line 9-9 in FIG. 8;

FIG. 10 is an end view of the end cap of FIG. 1;

FIG. 11 is a side view of the center support;

FIG. 12 is a front view of the center support taken in accordance with directional line 12-12 in FIG. 11;

FIG. 13 is a front end view of the end bearing;

FIG. 14 is a side view of the end bearing taken in accordance with directional line 14-14 in FIG. 13;

FIG. 15 is a rear end view of the end bearing taken in accordance with directional line 15-15 in FIG. 14;

FIG. 16 is a plan view of the end link;

FIG. 17 is a side view of the end link taken in accordance with directional line 17-17 in FIG. 16;

FIG. 18 is a side view of the center link;

FIG. 19 is a plan view of the center link taken in accordance with directional line 19-19 in FIG. 18;

FIG. 20 is an end view of the torque tube;

FIG. 21 is a side view of the torque tube;

FIG. 22 is an end view of the housing;

FIG. 23 is a side view of the housing taken in accordance with directional line 23-23 in FIG. 22;

FIG. 25 is a plan view of one of the end members;

FIG. 26 is a side view of the end member of FIG. 25 taken in accordance with directional line 26-26 in FIG. 25;

FIG. 27 is a side view of the outer bearing member;

FIG. 28 is an end view of the outer bearing member taken in accordance with sectional line 28-28 in FIG. 27;

FIG. 29 is side view of the inner bearing member;

FIG. 30 is an end view of the inner bearing member taken in accordance with directional line 30-30 in FIG. 29;

FIG. 31 is a plan view of the inner bearing member taken in accordance with directional line 31-31 in FIG. 30;

FIG. 32 is a simplified diagram of the apparatus of the present disclosure to aid in understanding the pertinent formulas dealing with the torque generated by the apparatus;

FIG. 33 is a graph of the energy stored in the torque tube in relation to the biasing force of the biasing assembly;

FIG. 34 is a graph of the energy required to return the torque tube to its position of equilibrium; and FIG. 35 is a view of the apparatus shown in FIG. 1 but incorporating coil springs instead of Belleville washers.

DETAILED DESCRIPTION

Figure 24:
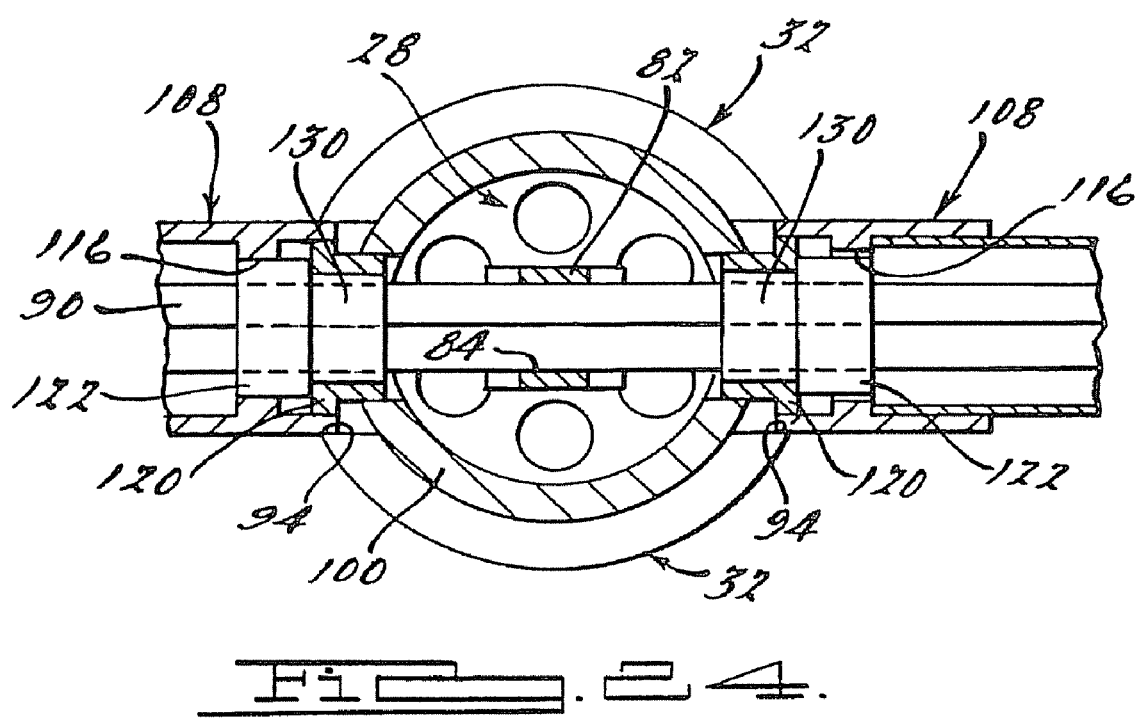
FIG. 24 is a cross-sectional side view of the end members secured to the housing.

The following description of various embodiment(s) is merely exemplary in nature and is in no way intended to limit the disclosure, its application, or uses.

Referring to FIG. 1, there is shown an apparatus 10 in accordance with a preferred embodiment of the present disclosure. The apparatus is useful for storing energy that can be "shuttled" between it and a structure such as a wing, airfoil, or rotorcraft blade to provide a twisting force (i.e., torque) to assist in twisting the wing, air foil, rotorcraft blade or any other structure requiring a bending or twisting force to be applied thereto. It is anticipated that the apparatus 10 will find significant utility in aircraft and aerospace applications where it is highly desirable to flex or twist a wing, air foil or rotorcraft blade during various phases of flight. However, the apparatus 10 may be adapted for use with virtually any structure that requires that its structural stiffness be overcome during twisting, bending or other movement thereof.

With reference to FIG. 1, the apparatus 10 generally includes a first assist assembly 12, a torque tube assembly 14, and a second assist assembly 16 which is identical in construction to the first assist assembly 12. However, it will be appreciated immediately that the present disclosure 10 can be implemented with only one of the assist assemblies 12 or 14 if desired, but will obviously provide only one-half of the torque that would be provided with both of the assist assemblies 12 and 16.

Since assist assemblies 12 and 16 are identical in construction, only the construction of assist assembly 12 will be described. Assist assembly 12 includes a tension adjuster 18, an end cap 19, an end guide 20, a spring guide 22, a biasing member or assembly 24, an end bearing 26, a center support 28 and a linkage assembly 30. Components 18-30, as well as the torque tube assembly 14, are disposed within a tubular housing 32. The housing 32 is supported within or adjacent the structure to be twisted or deformed, as will be explained in greater detail in the following paragraphs.

Referring to FIGS. 1, 4 and 5, the tension adjuster is shown in greater detail. The tension adjuster includes a preferably hex shaped shaft 34 on which a suitable wrench can be used to rotate the tension adjuster 18. The shaft 34 has a bore 35. A main body 36 has a mid flange 38 and an inside flange 40. The main body 36 also includes an opening 42 that communicates with bore 35.

Referring to FIGS. 1 and 6-7, the end guide 20 can be seen to include a bore 44. The end guide 20 further includes relief areas 46 for reducing weight. The end guide 20 fits over the outer surface of inside flange 40 of tension adjuster 18 such that the end guide 20 is supported on the inside flange.

Referring to FIGS. 1, 8-10, the spring guide 22 includes a body 48 having a flange 50 and a bore 52. A portion of the body 48 extends within the bore 44 of the end guide 20 and is free to slide therewithin linearly (i.e., horizontally) in the drawing of FIG. 1.

With further reference to FIG. 1, the biasing assembly 24 is illustrated as a plurality of Belleville washers stacked one against another. However, it will be appreciated that a coil spring 24' or other suitable biasing element could just as readily be incorporated, as shown in FIG. 35. The Belleville washers, however, are particularly advantageous in that they provide a non-linear spring rate. The biasing assembly 24 thus serves to exert a biasing force that tends to urge the spring guide 22 to the right in the drawing of FIG. 1.

Referring to FIGS. 1 and 10, the end cap 19 includes a threaded bore 54 and a threaded internal recess 56. The threaded internal recess 56 fits over a threaded outer end 58 of the housing 32 to affix the end cap 19 to an end of the housing 32. The threaded bore 54 receives the threaded main body 36 of the tension adjuster 18. The position of the tension adjuster 18 can thus be adjusted by rotating with a suitable tool the hex shaped shaft 34, which causes the end guide 20 to be urged over the spring guide 22 which compresses the biasing assembly 24. In this manner, the biasing force exerted against the flange 50 of the spring guide can be adjusted.

Referring to FIGS. 11 and 12, the center support 28 can be seen to include a main body 60 having a protruding portion 62. A bore 64 extends through the main body 60 and portion 62. A plurality of holes 66 are preferably provided for weight reduction.

Referring to FIGS. 13-15, the end bearing 26 can be seen. End bearing 26 includes a shaft 70 extending from a body 68. A mounting portion 71 having a bore 72 is also formed to extend from the body 68. A hole 73 extends through the mounting portion 71.

With further reference to FIGS. 1 and 13-15, the shaft 70 of the end bearing 26 extends into the bore 52 of the spring guide 22, while the body 68 extends within the bore 64 of the center support 28.

Referring to FIGS. 16 and 17, an end link 74 associated with the linkage assembly 30 of FIG. 1 can be seen in greater detail. The end link 74 comprises an H-shaped component having arms 76 which include openings 78 and 80 formed therein. Openings 78 are aligned to receive a dowel pin 80 (FIG. 1) for coupling the end link 74 to the mounting portion 71 of the end bearing 26. Thus, the end link 76 is free to pivot about the mounting portion 71.

With reference to FIGS. 1, 18 and 19, a portion of the torque tube assembly 14 can be seen in the form of a center link 82. The center link 82 includes a hex-shaped opening 84 and a pair of bores 86 on opposite sides of the hex-shaped opening 84. One of the bores 86 fits between one pair of the arms 76 of the end link 74 and is held therein by a dowel pin 88 (FIG. 1) that extends through openings 80 (FIG. 16) to pivotally couple the center link 82 to the end link 74. The other bore 86 is identically coupled to the end 74 link of the second assist assembly 16.

Referring to FIGS. 20 and 21, a torque tube 90 associated with the torque tube assembly 14 is shown. Torque tube 90 includes a hex-shaped outer surface and a bore 92 formed to reduce the weight of the torque tube 90. The torque tube 90 is slidably received within the hex-shaped opening 84 of the center link 82. Referring briefly to FIG. 1, the torque tube 90 also extends out through an opening 94 in the housing 32. Thus, the torque tube 94 extends normal to the direction of motion of the end bearing 26.

Referring now to FIGS. 22 and 23, the housing 32 will be described in greater detail. In addition to the opening 94, the housing 32 includes an inner bore 96 extending entirely through its length with a reduced diameter section 98 along a mid portion thereof. Reduced diameter area 98 thus forms a pair of steps 100 internal to the housing 32. Each step 100 abuts one of the center supports 28 of the apparatus 10. End guide 20 (FIG. 1) is further dimensioned to fit within bore 96 so as to be able to move slideably within the bore 96. On opposite sides of the bore 94 are a pair of openings 102. Another pair of openings 104 are provided outside of openings 102. Still another plurality of bore openings 106 are provided about the opening 94. Openings 102, 104 and 106 all extend through to the back (i.e., hidden from view) side of housing 32 so as to allow fastening elements such as dowel pins or threaded fasteners to extend entirely through the housing 32.

Referring now to FIGS. 24-26, the use of a pair of end members 108 can be seen. In FIG. 24, the end members 108 are shown secured to the housing 32. End member 108 essentially forms a support to assist in holding the torque tube 90 and to prevent "bowing" of the torque tube in response to torque applied by the linkage assembly 30. The end member 108 is shown in detail in FIGS. 25 and 26 and includes face portions 110 which each include an opening 112. Dowel pins or other like securing members (not shown) extend through the openings 112 and are used to secure the face portions 110 to the outer surface of the housing 32 perpendicularly to the housing. The end member 108 further includes a bore 114 which extends through the end member. A reduced diameter portion 116 (FIG. 26) of the bore 114 forms an internal circumferential shoulder. Holes 116 are formed on opposite sides of bore 114 and align with openings 102 in the housing 32 shown in FIG. 23. Dowel pins or like elements (not shown) extend through holes 116 and through openings 102 in the housing 32 to help secure the end member to the housing 32.

Referring now to FIGS. 27-30, an outer bearing member 120 (FIGS. 27 and 28) and an inner bearing member 122 (FIGS. 29-31) are shown. The outer bearing member 120 includes a body 124 and a flange 126. Body 124 includes an opening 128 extending therethrough. The inner bearing member 122 (FIGS. 29-31) includes a neck 130 and a body 132. A bore 134 extends through the length of the inner bearing member 122 and a threaded set screw opening 136 opens into the bore 134. Neck 130 fits within the bore 128 of the outer bearing member 120 and the body 132 of the inner bearing member 122 abuts the flange 126 of the outer bearing member 120 as shown in FIG. 24. The bore 134 is further hex-shaped, as seen in FIG. 30. This hex-shaped bore 134 receives the torque tube 90 therethrough and thus provides support, in combination with the end member 108, to prevent bowing of the torque tube.

One implementation of the apparatus 10 is shown in FIG. 2 in simplified form. The torque tube 90 extends within a rotorcraft blade 138 from approximately a root portion 140 of the blade to a tip portion 142 thereof. A suitable supporting structure 144 is disposed within the blade 138 at the tip portion 142 to affix the outermost end 90a of the torque tube 90 to the blade 138. A bearing assembly 146 is disposed within the blade 138 near the root portion 140. The housing 32 is also secured to an interior area 146 of the blade 138. Alternatively, the housing 138 can be secured to spars or other structural elements inside a wing or airfoil. An actuator 148 is mechanically coupled to the torque tube 90 and is used to initiate rotational movement of the torque tube 90. However, due to the significant mechanical energy stored by the biasing assemblies 24, the actuator 148 is able to rotate the torque tube 90 using only a small fraction of the force that would otherwise be required from the actuator 148. Put differently, the apparatus 10 provides the great majority of the mechanical energy (i.e., torque) required to twist the blade 138 due to the negative spring force experienced by the blade 138. In practice, the apparatus 10 essentially "shuttles" energy between the blade 138 and biasing assembly 24. When the blade 138 is in its twisted state, the blade is storing the energy that was previously stored in the apparatus 10. When the actuator 148 returns the torque tube 90 to its initial position (i.e., to de-flex the blade 138), the energy in the blade 138 is transferred back to the apparatus 10. The apparatus 10 thus provides substantially a "zero stiffness" at the root portion 140 of the blade 90 that allows the blade 138 to twist with only a very small force from the external actuator 148.

With further reference to FIG. 1, the apparatus 10 is assembled such that the biasing assemblies 24 are under compression (i.e., preloaded) when the torque tube 90 is in the position shown in FIG. 3. Thus, the linkage assemblies 30 will each have three points of equilibrium, one being represented by the position of the coupling assemblies 30 in FIG. 3, one by the position of the linkage assemblies in FIG. 3, and one where the torque tube 90 has been rotated slightly clockwise from the orientation shown in FIG. 3. The coupling assemblies 30 are thus free to move the torque tube 90 either clockwise or counterclockwise in the drawings of FIGS. 1 and 3, and the position of the linkage assembly 30 in FIG. 1 represents rotation of the torque tube in the counterclockwise direction. Once the actuator 148 (FIG. 2) applies a very small force to the torque tube 90, the biasing force provided by the biasing assemblies 24 immediately assists in rotating the torque tube 90 either clockwise or counterclockwise depending upon the movement of the actuator 148. With the linkage assemblies 30 in the position of equilibrium shown in FIG. 3, only a very small force is required from actuator 148 to hold the torque tube 90 stationary. However, as described above, rotation of the torque tube in either the clockwise or counter-clockwise directions (relative to FIGS. 1 and 3) requires only a very small force from the actuator 148. In practice, the reduction of torque required by the actuator 148 can be up to an order of 1/1000 of the torque that would otherwise be required to twist the blade 138.

Referring now to FIGS. 32-34, the force required to move the torque rod 90 and the energy required to return the torque rod to its initial position of equilibrium will be described in connection with several formulas. The torque provided by each linkage assembly 30 to the torque tube 90 can be expressed by the following formula:

$$T_{SES\text{-}to\text{-}Ptt} = 2 * L * F_{spring} * \sin(\Theta_{Ptt}) \qquad \text{Equation 1}$$

Where: $T_{SES\text{-}to\text{-}Ptt}$ is the torque applied to the torque tube 90.

The change in length of the biasing assembly (i.e., spring) can be represented by the following formula:

$$\delta_X = 2 * L(1 - \cos(\Theta_{Ptt})) \qquad \text{Equation 2}$$

The force needed to move the biasing assemblies from one stable position to the other is represented by:

$$F_{min} = \frac{T_{Ptt-max}}{2*L*\sin(\Theta_{Ptt-max})} \quad \text{Equation 3}$$

Referring to FIG. 33, graph 150 illustrates that the energy stored by the torque tube 90 is essentially equal to the energy provided by the baising assemblies 24.

Referring to FIG. 34, the energy required to return the torque tube 90 to its initial position of equilibrium (shown in FIG. 3) is represented by portion 154 of graph 152.

From the foregoing, then, it will be appreciated that the apparatus 10 provides a means for dramatically reducing the force needed by an actuator to twist or bend an air foil, wing, rotorcraft blade or any other object that requires a bending or twisting force to be applied thereto during its operation.

While various embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A method for providing torque to assist in moving a component of a mobile platform, the method comprising:
    applying biasing forces to opposing portions of a torque transferring member, through a pair of assist assemblies each having a threaded mechanism to enable a user adjustable preload force to be applied to said opposing portions of said torque transferring member, to exert axially aligned, opposing preload forces on said torque transferring member that enable said torque transferring member to be maintained in a position of equilibrium;
    applying a torque to one of said component and said torque transferring member such that axially opposing preload forces are moved out of axial opposing alignment with one another, to thus cause said biasing forces to cooperatively exert a torque on said torque transferring member to assist in moving said torque transferring member out from said position of equilibrium; and
    using said motion of said torque transferring member out from said position of equilibrium to exert a torque on said component to assist in moving said component.

2. The method of claim 1, wherein said applying biasing forces to opposing portions of said torque transferring member comprises using a pair of coil springs arranged to exert counteracting forces on said torque transferring member when said torque transferring member is in said position of equilibrium.

3. The method of claim 2, wherein said applying biasing forces to said opposing portions of said torque transferring member comprises aligning an axial center of each of said coil springs and operatively coupling each of said coil springs via a pair of pivotal links with said torque transferring member.

4. The method of claim 1, wherein said applying biasing forces to opposing portions of a torque transferring member comprises using a pair of Belleville washers arranged to exert counteracting forces on said torque transferring member when said torque transferring member is in said position of equilibrium.

5. The method of claim 1, wherein said applying biasing forces comprises using one of coil springs and Belleville washers that are installed relative to said torque transferring member to be under compression when said torque transferring member is in said position of equilibrium.

6. The method of claim 5, wherein said applying a torque to one of said torque transferring member and said component comprises using an independent actuator.

7. The method of claim 1, wherein said using motion of said torque transferring member to assist in moving said component comprises using motion of said torque transferring member to assist in moving a flight control component of an airborne mobile platform.

8. A method for providing a torque to a flight control component of an airborne mobile platform to assist in moving said flight control component, the method comprising:
    coupling a torque transferring member to said flight control component to assist in moving the flight control component;
    disposing a biasing member under one of controlled amount of compression and a controlled amount of tension, relative to said torque transferring member, to exert a user adjustable preload force, via a threaded adjustment mechanism and a pivotal link, on said torque transferring member that acts to apply a torque on said torque transferring member when said torque transferring member is moved from a first position of equilibrium, wherein in said first position said preload force is directed along a linear path through the pivotal link, along an axial center of the biasing member, and through an axial center of said torque transferring member and thus causes no rotation causing torque to be applied to said torque transferring member, to a second position wherein, in said second position, said pivotal link applies said preload force along an axis that does not extend through an axial center of said torque transferring member, to thus cause said torque transferring member to exert a torque on said flight control component; and
    using an actuator to initiate movement of one of said torque transferring member and said component to urge said torque transferring component into said second position, wherein said preload force from said biasing member assists in urging said torque transferring member to move rotationally to said second position.

9. The method of claim 8, wherein disposing a biasing member comprises disposing at least one Belleville washer under compression.

10. The method of claim 9, wherein disposing a Belleville washer comprises disposing a plurality of Belleville washers stacked adjacent one another.

11. The method of claim 8, further comprising disposing an additional biasing member to exert one of compression and tension relative to said torque transferring member, and such that said biasing member and said additional biasing member work cooperatively to maintain said torque transferring member in said first position of equilibrium, and where said biasing member and said additional biasing member cooperate to urge said torque transferring member rotationally when said torque transferring member is moved out of said first position of equilibrium toward said second position.

12. The method of claim 11, wherein said biasing member and said additional biasing member are arranged so that their axial centers are aligned.

13. The method of claim 12, further comprising coupling said additional biasing member via an additional pivotal link to said torque transferring member.

14. A method for moving a flight control structure on an airborne mobile platform between first and second positions in a manner that overcomes an inherent structural stiffness of the structure, comprising:
   coupling at least one end of a force transferring member fixedly to said structure;
   loading a biasing element, while said structure is being held in said first position, with a controlled preload force, via a user adjustable threaded mechanism, such that the biasing element exerts a preload force aligned with an axial center of said force transferring member, and which is sufficient to substantially hold said structure in said first position;
   loading an additional biasing element such that said biasing element and said additional biasing element produce counteracting and offsetting controlled preload forces when said structure is in said first position;
   further comprising arranging said biasing element and said additional biasing element such that an axial center of each is aligned;
   using said preload force applied by said biasing element to move said torque transferring member when said preload force is directed away from said axial center of said force transferring member, so as to assist in moving said structure from said first position to said second position when movement of said structure is initiated by an external component, to thus substantially transfer said stored energy of said biasing element to said structure through said torque transferring member; and
   using said biasing element to again store said energy when said structure is moved from said second position back to said first position.

15. The method of claim 14, wherein said first position represents a position of equilibrium where a substantially reduced force is required to maintain said structure against movement.

16. The method of claim 14, wherein said biasing element provides a non-linear spring force that enables said structure to be moved from said second position back into said first position with less force than that needed to move said structure from said first position into said second position.

* * * * *